(12) United States Patent
Kim

(10) Patent No.: US 11,063,447 B2
(45) Date of Patent: Jul. 13, 2021

(54) BATTERY PACK AND ENERGY STORAGE SYSTEM COMPRISING SAME

(71) Applicant: Samsung SDI Co., Ltd., Yongin-si (KR)

(72) Inventor: Jaesoon Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 225 days.

(21) Appl. No.: 16/321,994

(22) PCT Filed: Jun. 5, 2017

(86) PCT No.: PCT/KR2017/005866
§ 371 (c)(1),
(2) Date: Jan. 30, 2019

(87) PCT Pub. No.: WO2018/026096
PCT Pub. Date: Feb. 8, 2018

(65) Prior Publication Data
US 2019/0181659 A1 Jun. 13, 2019

(30) Foreign Application Priority Data
Aug. 2, 2016 (KR) .................. 10-2016-0098450

(51) Int. Cl.
*H02J 7/00* (2006.01)
*H01M 10/44* (2006.01)
(Continued)

(52) U.S. Cl.
CPC .......... *H02J 7/0021* (2013.01); *H01M 10/44* (2013.01); *H01M 10/441* (2013.01);
(Continued)

(58) Field of Classification Search
CPC ...... H02J 7/0021; H02J 7/0029; H02J 7/0031; H02J 7/0048; H02J 7/00304; H02J 3/32;
(Continued)

(56) References Cited

U.S. PATENT DOCUMENTS 5,493,197 A 2/1996 Eguchi et al.
5,853,908 A 12/1998 Okutoh
(Continued)

FOREIGN PATENT DOCUMENTS

JP 5-207642 A 8/1993
JP 6-104015 A 4/1994
(Continued)

OTHER PUBLICATIONS

Written Opinion for corresponding International Application No. PCT/KR2017/005866, dated Aug. 18, 2017, 6pp.
(Continued)

*Primary Examiner* — Edward Tso
*Assistant Examiner* — Aaron Piggush
(74) *Attorney, Agent, or Firm* — Lewis Roca Rothgerber Christie LLP

(57) ABSTRACT

Various embodiments provide battery packs. A battery pack includes: a battery including at least one battery cell and configured to be discharged at a first discharge current or a second discharge current; and a switch connected to the battery and placed on a high current path through which charge current and discharge current of the battery flow, wherein when the discharge current of the battery is the first discharge current, discharging of the battery is stopped as voltage of the battery reaches a first discharge cut-off voltage, and when the discharge current of the battery is the second discharge current, discharging of the battery is stopped as the voltage of the battery reaches a second discharge cut-off voltage, wherein the first discharge current is greater than the second discharge current, and the first discharge cut-off voltage is greater than the second discharge cut-off voltage.

15 Claims, 7 Drawing Sheets

(51) Int. Cl.
  *H01M 10/46* (2006.01)
  *H02J 3/32* (2006.01)
  *H01M 10/42* (2006.01)
  *H01M 50/20* (2021.01)

(52) U.S. Cl.
  CPC ......... *H01M 10/448* (2013.01); *H01M 10/46* (2013.01); *H02J 3/32* (2013.01); *H02J 7/0029* (2013.01); *H02J 7/0031* (2013.01); *H01M 10/42* (2013.01); *H01M 50/20* (2021.01); *H02J 7/0048* (2020.01); *H02J 7/00304* (2020.01)

(58) Field of Classification Search
  CPC ........ H01M 2/10; H01M 10/42; H01M 10/44; H01M 10/46; H01M 10/441; H01M 10/448
  USPC ................. 320/112, 125, 134, 136, 159, 164
  See application file for complete search history.

(56) References Cited

U.S. PATENT DOCUMENTS

| | | | |
|---|---|---|---|
| 7,489,108 B2 * | 2/2009 | Matsumoto | H02J 7/0029 320/132 |
| 8,258,756 B2 | 9/2012 | Lim | |
| 9,575,131 B2 | 2/2017 | Okumura | |
| 2011/0109273 A1 * | 5/2011 | Tamezane | B60L 58/15 320/132 |
| 2011/0279088 A1 * | 11/2011 | Yamamoto | H01M 10/48 320/134 |
| 2012/0185190 A1 * | 7/2012 | Okumura | G01R 31/367 702/63 |
| 2014/0159919 A1 * | 6/2014 | Furui | B25F 3/00 340/870.07 |

FOREIGN PATENT DOCUMENTS

| | | |
|---|---|---|
| JP | 10-136581 A | 5/1998 |
| JP | 10-257605 A | 9/1998 |
| KR | 10-2006-0028298 A | 3/2006 |
| KR | 10-0657344 B1 | 12/2006 |
| KR | 10-2008-0111995 A | 12/2008 |
| KR | 10-2009-0113027 A | 10/2009 |
| KR | 10-2015-0042638 A | 4/2015 |
| WO | WO 2011/013248 A1 | 2/2011 |

OTHER PUBLICATIONS

International Search Report for corresponding International Application No. PCT/KR2017/005866, dated Aug. 18, 2017, 5pp.
Korean Office action issued in corresponding application KR 10-2016-0098450, dated Dec. 3, 2020, 6 pages.

* cited by examiner

BATTERY PACK AND ENERGY STORAGE SYSTEM COMPRISING SAME

CROSS-REFERENCE TO RELATED APPLICATION(S)

This application is a National Phase Patent Application of International Patent Application Number PCT/KR2017/005866, filed on Jun. 5, 2017, which claims priority of Korean Patent Application No. 10-2016-0098450, filed Aug. 2, 2016. The entire contents of both of which are incorporated herein by reference.

TECHNICAL FIELD

Embodiments of the present disclosure relate to a battery pack and an energy storage system.

BACKGROUND ART

The importance of new renewable energy has newly been emphasized along with recent global environmental changes. Particularly, since solar power generation systems generating electricity using solar energy are harmless and easy to install and maintain, there is increasing interest in solar power generation systems.

Energy storage systems are used to efficiently manage electricity by storing generated electricity and supplying the stored electricity during peak-demand periods. For example, energy storage systems may receive surplus electricity from a grid at night and store the electricity in energy storage devices to supply the electricity during the day. Therefore, energy storage systems may reduce the peak amount of power generation during the day by using surplus midnight electricity.

Such an energy storage system includes at least one battery pack, and the battery pack includes at least one battery. The lifespan of the battery may markedly decrease if the battery is overdischarged, and thus when the voltage of the battery reaches a preset discharge cut-off voltage, discharging of the battery is stopped to prevent the battery from being overdischarged. When the battery is manufactured, the discharge cut-off voltage of the battery is preset by considering average output power required for the battery. In particular, when the battery pack is required to have high output power, the discharge cut-off voltage of the battery pack is set according to the high output power requirement. However, the battery pack may be required to have low output power in a specific period. In a situation requiring low output power, if discharging of the battery pack is stopped at a discharge cut-off voltage set for a high output power situation, energy stored in the battery may not be efficiently used.

DESCRIPTION OF EMBODIMENTS

Technical Problem

Technical problems of the present disclosure are to provide a battery pack and an energy storage system configured to efficiently use energy stored in batteries of the battery pack and the energy storage system by setting the discharge cut-off voltage of the batteries differently according to required output power.

Solution to Problem

According to an aspect of the present disclosure, a battery pack includes: a battery including at least one battery cell and configured to be discharged at a first discharge current or a second discharge current; and a switch connected to the battery and placed on a high current path through which charge current and discharge current of the battery flow, wherein when the discharge current of the battery is the first discharge current, discharging of the battery is stopped as voltage of the battery reaches a first discharge cut-off voltage, and when the discharge current of the battery is the second discharge current, discharging of the battery is stopped as the voltage of the battery reaches a second discharge cut-off voltage, wherein the first discharge current is greater than the second discharge current, and the first discharge cut-off voltage is greater than the second discharge cut-off voltage.

In an example, the battery pack further includes a battery management system configured to monitor the discharge current of the battery and adjust a discharge cut-off voltage of the battery to the first discharge cut-off voltage or the second discharge cut-off voltage.

In another example of the battery pack, the battery management system adjusts the discharge cut-off voltage of the battery to the first discharge cut-off voltage or the second discharge cut-off voltage when the voltage of the battery reaches a first voltage.

In another example of the battery pack, when the first discharge current corresponds to a first discharge current period, the battery management system adjusts the discharge cut-off voltage of the battery to the first discharge cut-off voltage, and when the second discharge current corresponds to a second discharge current period, the battery management system adjusts the discharge cut-off voltage of the battery to the second discharge cut-off voltage.

In another example of the battery pack, when an average of the discharge current of the battery for a preset time period is the first discharge current, the battery management system adjusts the discharge cut-off voltage of the battery to the first discharge cut-off voltage, and when the average of the discharge current of the battery for the present time period is the second discharge current, the battery management system adjusts the discharge cut-off voltage of the battery to the second discharge cut-off voltage.

In another example of the battery pack, the battery management system acquires an amount of power corresponding to a preset time period from a power recording unit; when the acquired amount of power is a first amount of power, the battery management system adjusts the discharge cut-off voltage of the battery to a third discharge cut-off voltage; and when the acquired amount of power is a second amount of power, the battery management system adjusts the discharge cut-off voltage of the battery to a fourth discharge cut-off voltage.

In another example of the battery pack, the second amount of power is greater than the first amount of power, and the fourth discharge cut-off voltage is greater than that third discharge cut-off voltage.

According to an aspect of the present disclosure, an energy storage system includes: a plurality of battery packs each including a battery and a battery management system configured to control charging and discharging of the battery, the battery including at least one battery cell; and an overall controller configured to control charging and discharging of the plurality of battery packs, wherein when discharge current of the plurality of battery packs is a first discharge current and voltage of at least one of the plurality of battery packs is equal to or less than a first discharge cut-off voltage, the overall controller stops discharging, and when the discharge current of the plurality of battery packs is a second discharge current and voltage of at least one of the plurality of battery packs is equal to or less than a second discharge cut-off voltage, the overall controller stops discharging.

In an example of the energy storage system, the second discharge current is greater than the first discharge current, and the second discharge cut-off voltage is greater than the first discharge cut-off voltage.

In another example of the energy storage system, the battery management system monitors voltage and discharge current of a corresponding battery pack and transmits information about the monitored voltage and discharge current of the battery pack to the overall controller.

In another example of the energy storage system, the overall controller determines the first discharge cut-off voltage and the second discharge cut-off voltage on the basis of the number of battery cells included in each of the batteries and the number of the plurality of battery packs.

In another example of the energy storage system, the overall controller adjusts a discharge cut-off voltage to the first discharge cut-off voltage or the second discharge cut-off voltage when the voltage of at least one of the battery packs reaches a first voltage.

In another example of the energy storage system, when the first discharge current corresponds to a first discharge current period, the overall controller adjusts a discharge cut-off voltage to the first discharge cut-off voltage, and when the second discharge current corresponds to a second discharge current period, the overall controller adjusts the discharge cut-off voltage to the second discharge cut-off voltage.

In another example of the energy storage system, when an average of the discharge current of the plurality of battery packs for a present time period is the first discharge current, the overall controller adjusts a discharge cut-off voltage to the first discharge cut-off voltage, and when the average of the discharge current of the plurality of battery packs for the present time period is the second discharge current, the overall controller adjusts the discharge cut-off voltage to the second discharge cut-off voltage.

In another example of the energy storage system, the overall controller acquires an amount of power corresponding to a preset time period from a power recording unit; when the acquired amount of power is a first amount of power, the overall controller adjusts a discharge cut-off voltage to a third discharge cut-off voltage; and when the acquired amount of power is a second amount of power, the overall controller adjusts the discharge cut-off voltage to a fourth discharge cut-off voltage.

In another example of the energy storage system, the second amount of power is greater than the first amount of power, and the fourth discharge cut-off voltage is greater than that third discharge cut-off voltage.

Advantageous Effects of Disclosure

According to various embodiments of the present disclosure, the discharge cut-off voltage of the batteries included in the battery pack or the energy storage system is adjusted according to the output power of the battery pack or the energy storage system to efficiently use energy stored in the batteries.

MODE OF DISCLOSURE

Figure 1:
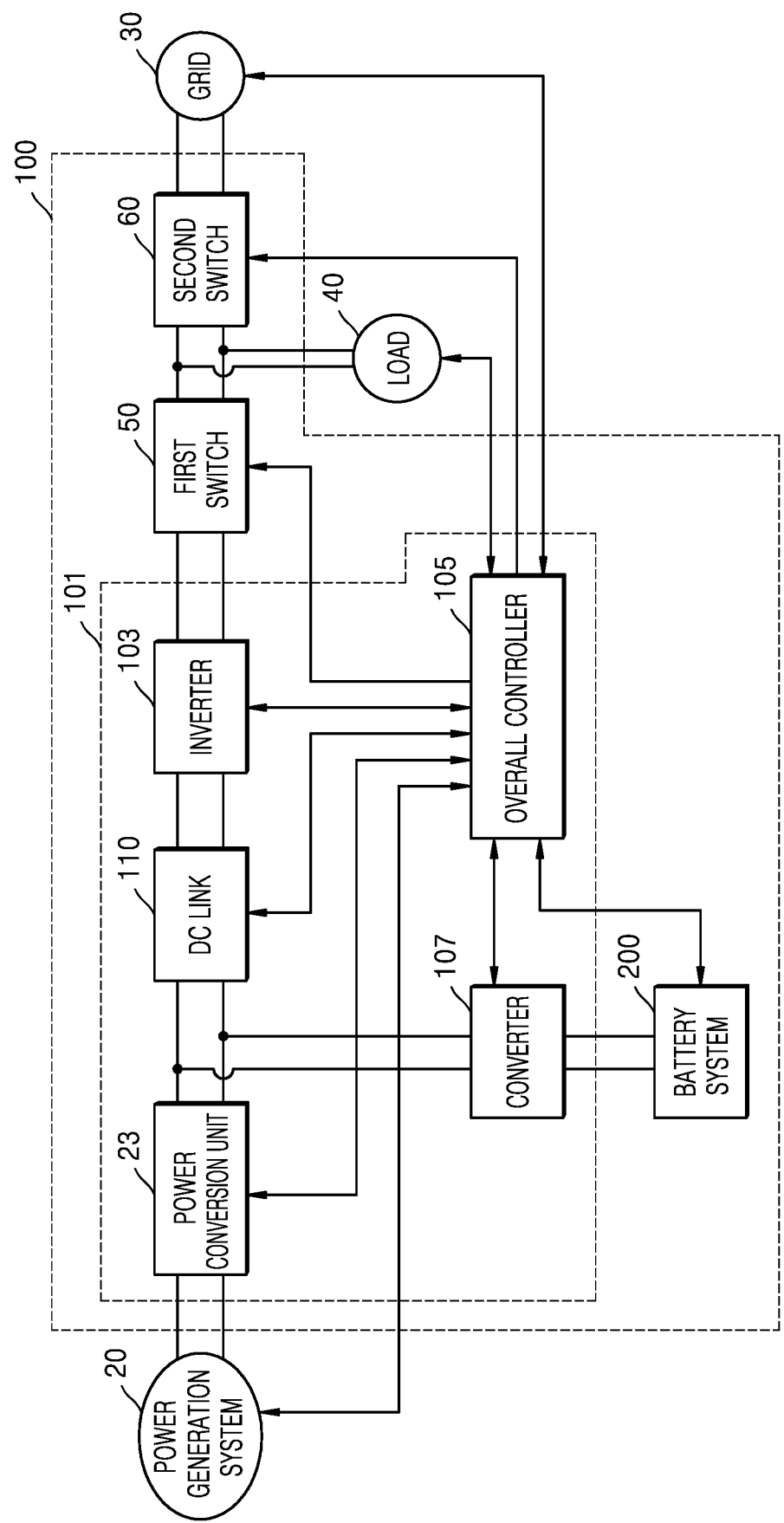
FIG. 1 is a schematic view illustrating an energy storage system and peripheral structures thereof according to an embodiment.

Advantages and features of the present disclosure, and implementation methods thereof will be clarified through the following descriptions given with reference to the accompanying drawings. However, the following embodiments of the present disclosure are non-limiting examples and may have different forms, and it should be understood that the idea and technical scope of the present disclosure cover all the modifications, equivalents, and replacements. Rather, these embodiments are provided so that this disclosure will be thorough and complete, and will fully convey the scope of the present disclosure to those skilled in the art. Moreover, detailed descriptions related to well-known functions or configurations will be omitted in order not to unnecessarily obscure subject matters of the present disclosure.

For example, specific shapes, structures, and features described in one example embodiment may be modified in another example embodiment without departing from the scope of the present disclosure. In addition, the positions or arrangement of elements described in one example embodiment may be changed in another example embodiment within the scope of the present disclosure. That is, the following description is provided for illustrative purposes only and is not intended to limit the scope of the present disclosure. The scope of the present disclosure is defined by the claims and equivalents thereof. In the drawings, like reference numerals denote like elements. Details described in the present disclosure are examples. That is, such details may be changed in other example embodiments within the spirit and scope of the present disclosure.

It will be understood that although the terms "first," "second," etc. may be used herein to describe various elements, these elements should not be limited by these terms. These terms are only used to distinguish one element from another.

The terminology used herein is for explaining specific embodiments only and is not intended to limit the scope of the present disclosure. The terms of a singular form may include plural forms unless otherwise mentioned. It will be understood that terms such as "comprise," "include," and "have," when used herein, specify the presence of state features, integers, steps, operations, elements, components, or combinations thereof, but do not preclude the presence or addition of one or more other features, integers, steps, operations, elements, components, or combinations thereof. It will be understood that although the terms "first" and "second" are used herein to describe various elements, these elements should not be limited by these terms. These terms are only used to distinguish one element or component from other elements or components.

Hereinafter, example embodiments will be described in detail with reference to the accompanying drawings. In the drawings, like reference numerals denote like elements, and overlapping descriptions thereof will be omitted.

FIG. 1 is a schematic view illustrating an energy storage system and peripheral structures thereof according to an embodiment.

A power generation system 20 generates electricity using an energy source and supplies the electricity to the energy storage system 100. The power generation system 20 may include any power generation system that generates power using new renewable energy, such as a solar power generation system, a wind power generation system, and a tidal power generation system.

A grid 30 may include power plants, substations, transmission lines, etc. The grid 30 may supply electricity to the energy storage system 100 to supply electricity to a load 40 and/or a battery system 200. Conversely, the grid 30 may receive electricity from the energy storage system 100.

The load 40 consumes electricity generated by the power generation system 20, electricity stored in the battery system 200, or electricity supplied from the grid 30. For example, the load 40 may be a home or factory.

The energy storage system 100 may store electricity generated by the power generation system 20 in the battery system 200 or may supply the stored electricity to the grid 30. In addition, the energy storage system 100 may supply electricity stored in the battery system 200 to the grid 30 or may store electricity supplied from the grid 30 in the battery system 200. In addition, the energy storage system 100 may perform an uninterruptible power supply (UPS) operation when a power failure occurs in the grid 30.

The energy storage system 100 includes a power conversion system 101 (hereinafter referred to as a PCS 101) configured to control power conversion, and the battery system 200.

The PCS 101 properly converts electricity of the power generation system 20, the grid 30, and the battery system 200 and supplies the converted electricity to a place or device requiring electricity. The PCS 101 includes a power conversion unit 23, a DC link 110, an inverter 103, a converter 107, a first switch 50, a second switch 60, and an overall controller 105.

The power conversion unit 23 is connected between the power generation system 20 and the DC link 110. The power conversion unit 23 transmits electricity produced by the power generation system 20 to the DC link 110. At this time, the power conversion unit 23 converts the output voltage of the power generation system 20 into DC link voltage.

The power conversion unit 23 may include devices such as a converter or a rectifier circuit according to the type of the power generation system 20. If the power generation system 20 generates DC electricity, the power conversion unit 23 may include a converter configured to convert DC electricity into DC electricity. If the power generation system 20 generates AC electricity, the power conversion unit 23 may include a rectifier circuit configured to convert AC electricity into DC electricity. In particular, if the power generation system 20 generates electricity using sunlight, the power conversion unit 23 may include a maximum power point tracking (MPPT) converter configured to perform MPPT control to maximally obtain electricity produced by the power generation system 20 according to factors such as the amount of solar radiation and temperature.

The DC link 110 is connected between the power conversion unit 23 and the inverter 103. The DC link 110 prevents the occurrence of an instantaneous voltage drop in the power generation system 20 or the grid 30 and the occurrence of a peak load in the load 40, thereby stably maintaining DC link voltage.

The inverter 103 is a power conversion device connected between the DC link 110 and the first switch 50. In discharge mode, the inverter 103 converts DC link voltage output from the power generation system 20 and/or the battery system 200 into AC voltage for the grid 30. Furthermore, the inverter 103 may include a rectifier circuit configured to rectify AC voltage of the grid 30 as DC link voltage so as to store electricity of the grid 30 in the battery system 200 in charge mode. That is, the inverter 103 may be a bidirectional inverter having invertible input and output sides.

The inverter 103 may include: a filter configured to remove harmonics from AC voltage which is output to the grid 30; and a phase locked loop (PLL) circuit configured to synchronize the phase of AC voltage output from the inverter 103 with the phase of AC voltage of the grid 30. In addition, the inverter 103 may have a function such as limiting the range of voltage variations, improving a power factor, removing a DC component, or transient phenomena protection. The operation of the inverter 103 may be stopped when the inverter 103 is not used to minimize power consumption.

The converter 107 is a power conversion device connected between the DC link 110 and the battery system 200. In discharge mode, the converter 107 performs DC-DC conversion to convert electricity stored in the battery system 200 into a voltage level required by the inverter 103, that is, a DC link voltage, and outputs the DC link voltage. Furthermore, in charge mode, the converter 107 performs DC-DC conversion to convert electricity output from the power conversion unit 23 or the inverter 103 into a voltage level required by the battery system 200, that is, a charge voltage. That is, the converter 107 may be a bidirectional converter having invertible input and output sides. If it is not necessary to charge or discharge the battery system 200, the operation of the converter 107 may be stopped to minimize power consumption.

The first switch 50 and the second switch 60 are connected in series between the inverter 103 and the grid 30 and are turned on/off under the control of the overall controller 105 in order to control the flow of current between the power generation system 20 and the grid 30. The first and second switches 50 and 60 may be turned on or off according to the states of the power generation system 20, the grid 30, and the battery system 200. For example, when the amount of power required in the load 40 is large, both the first switch 50 and the second switch 60 are turned on to use electricity supplied from both the power generation system 20 and the grid 30. If the amount of electricity supplied from the power generation system 20 and the grid 30 is insufficient to satisfy the amount of electricity required in the load 40, electricity stored in the battery system 200 may also be supplied to the load 40. If a power failure occurs in the grid 30, the second switch 60 is turned off, and the first switch 50 is turned on. In this manner, electricity may be supplied from the power generation system 20 or the battery system 200 to the load 40, and it is possible to prevent the electricity supplied to the load 40 from being supplied to the grid 30, that is, it is possible to prevent islanding. Thus, accidents such as an electric shock accident in which workers working on power lines of the grid 30 or the like are injured by electric shock may be prevented.

The overall controller 105 monitors the states of the power generation system 20, the grid 30, the battery system 200, and the load 40, and controls the operations of the power conversion unit 23, the inverter 103, the converter 107, the first switch 50, and the second switch 60. Items that the overall controller 105 monitors may include whether a power failure has occurred in the grid 30 and whether the power generation system 20 generates electricity. In addition, the overall controller 105 may monitor the amount of electricity that the power generation system 20 generates, the state of charge of the battery system 200, the amount of power consumption of the load 40, time, etc.

Figure 2:
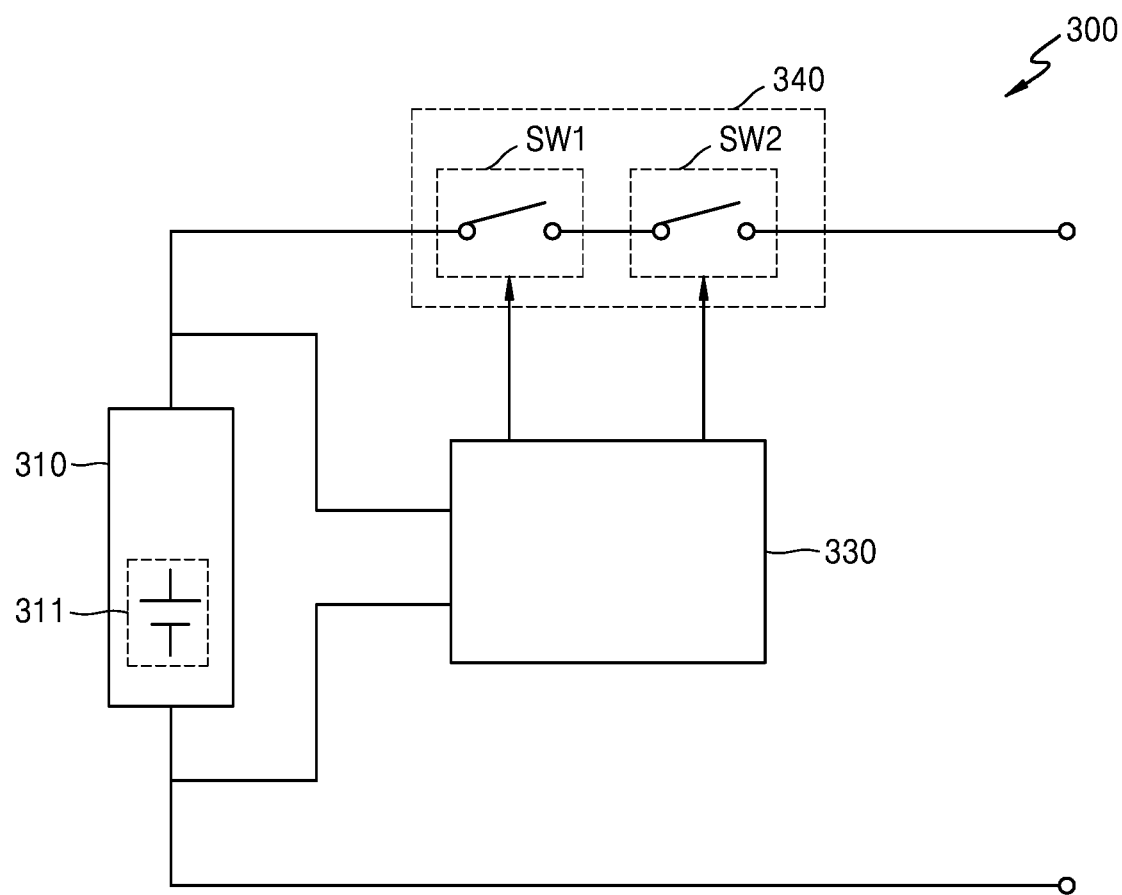
FIG. 2 is a schematic view illustrating the interior structure of a battery pack according to an embodiment.

FIG. 2 is a view schematically illustrating a battery pack according to an embodiment.

Referring to FIG. 2, the battery pack includes a battery management system 330, a battery 310, and a switch unit 340.

The battery management system 330 may be connected to the battery 310 and may control charge and discharge operations of the battery 310. To protect the battery 310, the battery management system 330 may perform an overcharge protection function, an overdischarge protection function, an overcurrent protection function, an overvoltage protection function, an overheating protection function, etc. To this end, the battery management system 330 may monitor states of the battery 310 such as voltage, current, temperature, remaining electricity, lifespan, state of charge. In addition, the battery management system 330 according to the present embodiment may estimate a state of charge (SOC) corresponding to a measured open circuit voltage (OCV).

The battery 310 receives electricity from a power generation system or a grid and stores the electricity, and then supplies the electricity to a load (for example, the load 40 shown in FIG. 1). The battery 310 may include one or more battery cells 311 connected in series and/or in parallel to each other. Here, the battery cells 311 are sub-components making up the battery 310. The battery 310 may be implemented by various battery cells 311 and may be a nickel-cadmium battery, a lead battery, a nickel metal hydride battery (NiMH), a lithium-ion battery, a lithium polymer battery, or the like.

The battery cells 311 may include rechargeable battery cells. For example, the battery cells 311 may include nickel-cadmium battery cells, lead battery cells, nickel metal hydride (NiMH) battery cells, lithium-ion battery cells, lithium polymer battery cells, or the like. However, the battery cells 311 are not limited thereto.

When the battery 310 reaches a given voltage in charge mode, the battery management system 330 stops charging of the battery 310 to protect the battery 310. The battery management system 330 may control the switch unit 340 to stop charging of the battery 310. In addition, when the battery 310 reaches a preset discharge cut-off voltage Vc in discharge mode, the battery management system 330 stops discharging of the battery 310. When the battery 310 is overcharged, the lifespan of the battery 310 is markedly reduced, and there is also a risk of explosion. In addition, even when the battery 310 is overdischarged, the lifespan of the battery 310 may be markedly reduced because of chemical changes in materials forming the battery 310 or the like. Therefore, the battery 310 needs to be controlled so as not to be overcharged or overdischarged. Specifically, the battery management system 330 may control the flow of current into and out of the battery 310 by using the switch unit 340. For example, when the voltage of the battery 310 becomes higher than an overcharge voltage, the battery management system 330 may perform an overcharge protection function to stop charging of the battery 310 by turning off the switch unit 340, and when the voltage of the battery 310 becomes lower than an overdischarge voltage, the battery management system 330 may perform an overdischarge protection function to stop discharging of the battery 310 by turning off the switch unit 340. In addition, the battery management system 330 may perform an overcurrent protection function, an overvoltage protection function, an overheating protection function, a cell balancing function, or the like.

The battery management system 330 may obtain states of the battery 310 such as the current, voltage, temperature, remaining electricity, lifespan, or state of charge (SOC) of the battery 310. For example, the battery management system 330 may measure the voltages and temperatures of the battery cells 311 using sensors. The battery management system 330 may open the switch unit 340 to protect the battery 310 when an abnormal situation such as an overcharge, overdischarge, overcurrent, or high-temperature situation occurs in the battery 310.

The switch unit 340 is placed on a high current path through which charge current and discharge current flow. The high current path means a path connecting the battery 310 to charge-discharge terminals of the battery pack 300, and thus the battery 310, the charge-discharge terminals, and the switch unit 340 may be connected in series. The switch unit 340 may stop charging and discharging of the battery 310 according to a control signal of the battery management system 330. The switch unit 340 may include a transistor or a relay. The switch unit 340 may include at least one of a charge switch SW1, a discharge switch SW2, and a separate protection switch. The switch unit 340 may include a relay switch to stop both charging and discharging.

The battery management system 330 stops discharging of the battery 310 when the voltage of the battery 310 is lower than a given value, thereby preventing the battery 310 from being overdischarged. The state of charge (SOC) of the battery 310 may be determined on the basis of the voltage of the battery 310. That is, as the voltage of the battery 310 decreases, the state of charge (SOC) of the battery 310 decreases. The given voltage refers to the discharge cut-off voltage Vc, and the discharge cut-off voltage Vc may be set in advance according to the average output power of the battery 310. When the battery 310 is continuously discharged at a voltage lower than the discharge cut-off voltage Vc, materials forming the battery 310 may become unstable and may adversely affect the lifespan of the battery 310. The discharge cut-off voltage Vc is set to a voltage up to which the battery 310 may maximally supply electricity without adverse influence on the lifespan of the battery 310.

According to an embodiment, the battery 310 may be discharged at a first discharge current or a second discharge current. In this case, when the discharge current of the battery 310 is the same as the first discharge current, discharging of the battery 310 may be stopped as the voltage of the battery 310 reaches a first discharge cut-off voltage, and when the discharge current of the battery 310 is the same as the second discharge current, discharging of the battery 310 may be stopped as the voltage of the battery 310 reaches a second discharge cut-off voltage. The first discharge current and the second discharge current refer to different arbitrary discharge currents of the battery 310, and the first discharge cut-off voltage and the second discharge cut-off voltage Vc are preset voltage values respectively corresponding to the first discharge current and the second discharge current so as to stop discharging of the battery 310 at the first and second discharge cut-off voltages for preventing overdischarge of the battery 310. The first discharge current is less than the second discharge current, and the first discharge cut-off voltage is less than the second discharge cut-off voltage. In terms of the efficiency of the battery 310, the voltage (discharge cut-off voltage Vc) of the battery 310 at which discharging of the battery 310 is stopped may be set to a higher value as the discharge current of the battery 310 becomes higher. Imbalance between the battery cells included in the battery 310 increases immediately before the battery 310 is overdischarged and also increases as the discharge current of the battery 310 increases. Therefore, in consideration of this imbalance, the discharge capacity of the battery 310 may be maximally utilized by previously setting the discharge cut-off voltage Vc of the battery 310 according to the discharge current of the battery 310. For example, the first discharge current is 1 A, the second discharge current is 2 A, the first discharge cut-off voltage set according to the first discharge current is 10 V, and the second discharge cut-off voltage set according to the second discharge current is 12 V. In this case, when the discharge current of the battery 310 is 1 A, discharging of the battery 310 is stopped as the voltage of the battery 310 reaches 10 V, and when the discharge current of the battery 310 is 2 A, discharging of the battery 310 is stopped as the voltage of the battery 310 reaches 12 V.

According to an embodiment, the battery management system 330 may adjust the discharge cut-off voltage Vc of the battery 310 according to the current of the battery 310. The battery management system 330 may increase the discharge cut-off voltage of the battery 310 as the current of the battery 310 increases and may decrease the discharge cut-off voltage of the battery 310 as the current of the battery 310 decreases. The battery management system 330 may set a discharge current corresponding to a previous discharge cut-off voltage of the battery 310 as a reference, and may compare a monitored discharge current of the battery 310 with the reference discharge current to determine whether to increase or decrease the discharge cut-off voltage of the battery 310. Alternatively, the battery management system 330 may previously store information about the discharge cut-off voltage of the battery 310 corresponding to the discharge current of the battery 310. In this case, the battery management system 330 may obtain a discharge cut-off voltage value corresponding to a monitored discharge current value of the battery 310 from the information.

For example, the battery 310 includes a plurality of battery cells 311 connected in series. The voltage of the battery 310 is the sum of the voltages of the plurality of battery cells 311 connected in series. The discharge cut-off voltage of the battery 310 is set to be a value obtained by multiplying the discharge cut-off voltage Vc of the battery cells 311 by the number of the battery cells 311. As the discharge current of the battery 310 increases, the voltage difference between the battery cells 311 increases. The voltage of the battery 310 is a value when the voltage difference between the battery cells 311 is not considered. A voltage value is set as the discharge cut-off voltage Vc for the battery cells 311 by considering the voltage difference between the battery cells 311 at a given current value. When the discharge current of the battery 310 becomes higher than a given current value, the voltage difference between the battery cells 311 is also increased. In this case, even when the voltage of the battery 310 does not drop to the discharge cut-off voltage of the battery 310, the voltages of some of the battery cells 311 may become lower than the discharge cut-off voltage Vc thereof. Therefore, since the voltage difference between the battery cells 311 increases as the discharge current of the battery 310 becomes higher than a reference current, it is necessary to increase the discharge cut-off voltage of the battery 310. Similarly, since the voltage difference between the battery cells 311 decreases as the discharge current of the battery 310 becomes lower than the reference current, the discharge cut-off voltage of the battery 310 may be adjusted to a lower value. Meanwhile, the voltage difference between a plurality of battery cells is called a cell voltage imbalance, and this will be described later in detail with reference to FIG. 3.

For example, the discharge cut-off voltage of the battery 310 may be set to be 32 V by considering the voltage difference between the battery cells 311 in the case in which the current of the battery 310 is 2 A. In this case, if the current of the battery 310 becomes 1 A which is lower than the current of 2 A corresponding to the discharge cut-off voltage of 32 V, the battery management system 330 may adjust the discharge cut-off voltage of the battery 310 to a lower value, 31V. If the current of the battery 310 is 3 A which is higher, by 1 A, than the current corresponding to the discharge cut-off voltage of 32 V, the battery management system 330 may adjust the discharge cut-off voltage of the battery 310 to a higher value, 33 V. If the current of the battery 310 is 4 A which is higher, by 2 A, than the current corresponding to the discharge cut-off voltage of 32 V, the battery management system 330 may adjust the discharge cut-off voltage of the battery 310 to a higher value, 34V.

The discharge cut-off voltage of the battery 310 at which the battery management system 330 stops discharging of the battery 310 may be fixed to a value set at the time of manufacture according to the average power consumption of a load to which the battery pack 300 will be connected. In this case, if a load to which the battery pack 300 will be connected require high-output performance, the discharge cut-off voltage of the battery 310 may be set to a relatively high value. Even when the load requires high-output performance on average, the load may require low output of the battery 310 in some period. Even in a period in which a load requires low output power, the battery management system 330 may stop discharging of the battery 310 if the voltage of the battery 310 reaches the discharge cut-off voltage which is set for high output power. When low output power is required for the battery 310, the discharge current of the battery 310 is also reduced. In this case, it is possible to discharge the battery 310 up to a voltage lower than the discharge cut-off voltage of the battery 310 set for high output power. That is, since discharging of the battery 310 is stopped even when it is possible to further discharge the battery 310, energy stored in the battery 310 may not be efficiently used. Therefore, according to an embodiment, the battery management system 330 may adjust the discharge cut-off voltage of the battery 310 according to the discharge current of the battery 310 so as to efficiently use energy stored in the battery 310.

Alternatively, the battery management system 330 may adjust the discharge cut-off voltage of the battery 310 by comparing the discharge rate (C-rate) of the battery 310 with a reference discharge rate. The discharge rate (C-rate) is a value obtained by dividing the discharge current of the battery 310 by the rated capacity of the battery 310, and the usable period of time of the battery 310 may be calculated or predicted using the discharge rate (C-rate). In general, the discharge rate (C-rate) may be used to indicate the output power of the battery 310. The reference discharge rate is a value set at the time of manufacture of the battery 310 according to the output power required by a load (for example, the load 40 shown in FIG. 1) expected to be connected to the battery 310. The battery management system 330 adjusts the discharge cut-off voltage of the battery 310 to a higher value if the discharge rate (C-rate) of the battery 310 is higher than the reference discharge rate and adjusts the discharge cut-off voltage of the battery 310 to a lower value if the discharge rate (C-rate) of the battery 310 is lower than the reference discharge rate.

Alternatively, the battery management system 330 may set the discharge cut-off voltage Vc for each preset current period. For example, when the discharge current of the battery 310 corresponds to a first period, the battery management system 330 may set the discharge cut-off voltage Vc to a value corresponding to the first period, and when the discharge current of the battery 310 corresponds to a second period, the battery management system 330 may set the discharge cut-off voltage to a value corresponding to the second period. For example, in the first period, the discharge current may be greater than 1 A but less than or equal to 2 A, and the discharge cut-off voltage corresponding thereto may be 10 V; and in the second period, the discharge current may be greater than 2 A but less than or equal to 3 A, and the discharge cut-off voltage corresponding thereto may be 12 V. In this case, if the discharge current of the battery 310 is 2.5 A, the battery management system 330 may set the discharge cut-off voltage to be 12 V corresponding to the second period, and if the discharge current of the battery 310 is 1.7 A, the battery management system 330 may set the discharge cut-off voltage to be 10 V corresponding to the first period.

Alternatively, the battery management system 330 may adjust the discharge cut-off voltage of the battery 310 by calculating the average of current values monitored from the battery 310 for a preset period of time. The battery management system 330 may calculate the average of current values of the battery 310 for the preset period of time and may then adjust the discharge cut-off voltage of the battery 310 in units of the preset period of time. For example, the current of the battery 310 may vary frequently with time. In this case, the battery management system 330 frequently adjusts the discharge cut-off voltage of the battery 310. Since the discharge cut-off voltage of the battery 310 is a value for determining when to stop discharging of the battery 310, it is not necessary to frequently adjust the discharge cut-off voltage of the battery 310 according to variations in the current of the battery 310. Therefore, the battery management system 330 may calculate the average of current values of the battery 310 for the preset period of time and may adjust the discharge cut-off voltage of the battery 310 at preset intervals.

Alternatively, the battery management system 330 may start adjusting the discharge cut-off voltage of the battery 310 when the voltage of the battery 310 falls below a preset reference voltage. The discharge cut-off voltage of the battery 310 is a value for determining when to stop discharging of the battery 310, and when the voltage of the battery 310 approaches the discharge cut-off voltage of the battery 310, the battery management system 330 is required to determine whether the voltage of the battery 310 reaches the discharge cut-off voltage for stopping discharging of the battery 310. Therefore, the preset reference voltage may be set to a value slightly greater than the maximum of the discharge cut-off voltage of the battery 310 that may be set by the battery management system 330. For example, if the maximum of the discharge cut-off voltage of the battery 310 that may be set by the battery management system 330 is 3.2 V, the preset reference voltage may be 3.3 V. When the voltage of the battery 310 is greater than 3.3 V, the battery management system 330 does not adjust the discharge cut-off voltage of the battery 310 because there is no risk of overdischarge of the battery 310. When the voltage of the battery 310 drops to 3.3 V, the battery management system 330 starts adjusting the discharge cut-off voltage of the battery 310 on the basis of monitored discharge current values of the battery 310.

Figure 3:
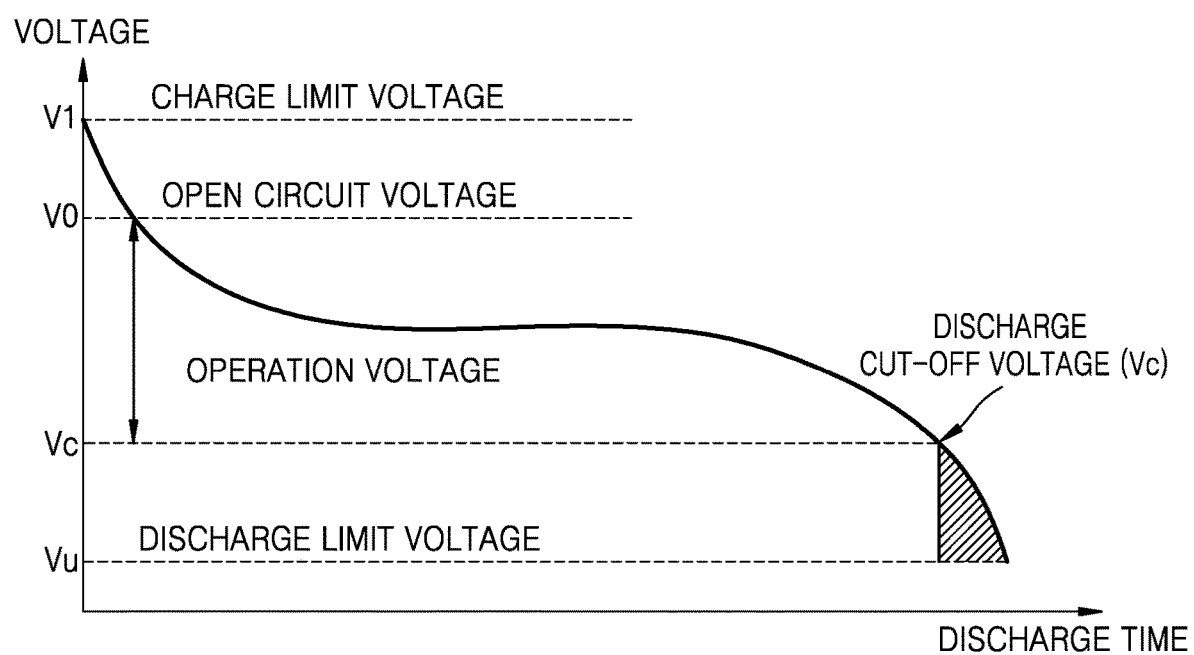
FIG. 3 is an example view illustrating variations in the voltage of a battery cell according to an embodiment.

FIG. 3 is an example view illustrating variations in the voltage of a battery cell according to an embodiment.

Referring to FIG. 3, the horizontal axis indicates the amount of discharge of a battery cell 311, and the vertical axis indicates the voltage of the battery cell 311. The graph shows the voltage of the battery cell 311 as the amount of discharge of the battery 310 increases. As the amount of discharge of the battery cell 311 increases and thus the state of charge (SOC) of the battery cell 311 approaches 0%, the voltage of the battery cell 311 varies greatly. That is, when the voltage of the battery cell 311 is lower than the discharge cut-off voltage Vc of the battery cell 311, the ratio of the decrease of the voltage of the battery cell 311 to the increase of the amount of discharge of the battery cell 311 increases compared to the other periods.

Referring to the graph, the discharge cut-off voltage Vc of the battery cell 311 is set to be higher than a discharge limit voltage Vu. If the battery cell 311 is discharged to the discharge limit voltage Vu, the lifespan of the battery cell 311 is adversely affected because of chemical reactions between materials forming the battery cell 311. Therefore, the discharge cut-off voltage Vc of the battery cell 311 is set such that the battery cell 311 may not be completely discharged and may thus have a certain amount of charge.

According to an embodiment, the discharge cut-off voltage of the battery 310 including a plurality of battery cells 311 connected in series may be set by considering the voltage difference between the battery cell 311. When a plurality of battery cells 311 are connected in series and are discharged, the voltages of the battery cells 311 are different. As discharging of the battery cells 311 proceeds, the voltages of the battery cells 311 may become different because of a resistance difference between the battery cells 311 and a contact resistance difference between the battery cell 311 caused by assembly of the battery cells 311. For example, it may be assumed that ten battery cells 311 are connected in series, and the discharge cut-off voltage of the battery 310 is 15V. When the battery 310 is discharged to 15 V, the voltage of each of the battery cells 311 may near 1.5 V. At this time, the voltages of the battery cells 311 may be greater than 1.5 V or less than 1.5 V. In this case, the difference between the minimum and maximum of the voltages of the battery cells 311 is called "cell voltage imbalance." The cell voltage imbalance becomes worse as the discharge cut-off voltage of the battery 310 is set to be closer to the discharge limit voltage Vu of the battery 310. As shown in the graph of FIG. 3, the reason for this is that the closer the voltage of the battery cell 311 is to the discharge limit voltage Vu, the more rapidly the amount of discharge of the battery cell 311 varies. Therefore, by considering the cell voltage imbalance between the battery cells 311, it is necessary to set the discharge cut-off voltage of the battery 310 to be higher than the discharge limit voltage Vu of the battery 310.

For example, it may be assumed that the discharge limit voltage Vu of the battery cells 311 is 2.7 V, the discharge cut-off voltage Vc of the battery cells 311 is 3.0 V, and the battery cells 311 are connected in series. The battery management system 330 may set the discharge cut-off voltage Vc of the battery 310 to be 30 V which is obtained multiplying 3.0 V by the number of the battery cells 311. When the voltage of the battery 310 decreases to 30 V, the battery management system 330 stops discharging of the battery 310 to prevent the battery 310 from being overdischarged. When the discharging of the battery 310 is stopped, the voltage values of the battery cells 311 may be maximally 3.118 V and minimally 2.719 V, and the cell voltage imbalance between the battery cells 311 may be about 0.399 V. Unlike this, if the discharge cut-off voltage Vc of the battery cells 311 is 3.3 V, the discharge cut-off voltage Vc of the battery 310 is 33 V. When the voltage of the battery 310 reaches 33 V and discharging of the battery 310 is stopped, the voltages of the battery cells 311 may be maximally 3.319 V and minimally 3.276 V, and the cell voltage imbalance between the battery cells 311 may be about 0.043 V. As described above, as the discharge cut-off voltage Vc of the battery cells 311 approaches the discharge limit voltage Vu of the battery cells 311, the cell voltage imbalance between the battery cells 311 increases.

In addition, the cell voltage imbalance between the battery cells 311 may vary with the amount of current flowing in the battery cells 311. As described above, the cell voltage imbalance between the battery cells 311 is caused by the resistance difference and contact resistance difference between the battery cells 311. Therefore, as the amount of current flowing in the battery cells 311 increases, resistance influence increases, and thus the cell voltage imbalance between the battery cells 311 also increases. Therefore, it may be necessary to set a higher discharge cut-off voltage for the battery 310 when the battery 310 supplies electricity to a load (for example, the load 40 shown in FIG. 1) requiring high output power than when the battery 310 supplies electricity to a load (for example, the load 40 shown in FIG. 1) requiring low output power.

For example, the discharge cut-off voltage of the battery 310 may be 3.1 V when the discharge current of the battery 310 is 1 A. In this case, it may be necessary to set the discharge cut-off voltage of the battery 310 to a value higher than 3.1 V if the discharge current of the battery 310 is higher than 1 A. In other words, by considering the cell voltage imbalance between the battery cells 311, the discharge cut-off voltage of the battery 310 may be set to a higher value when the battery 310 is required to have high output power than when the battery 310 is required to have low output power. However, when the discharge cut-off voltage of the battery 310 is set for high output power, discharging of the battery 310 may be stopped even though it is possible to further discharge the battery 310 to a voltage lower than the discharge cut-off voltage in a low output power period. In this case, the discharge efficiency of the battery 310 is low in the low output power period. Therefore, it is necessary to set the discharge cut-off voltage of the battery 310 differently according to the discharge current of the battery 310.

Figure 4:
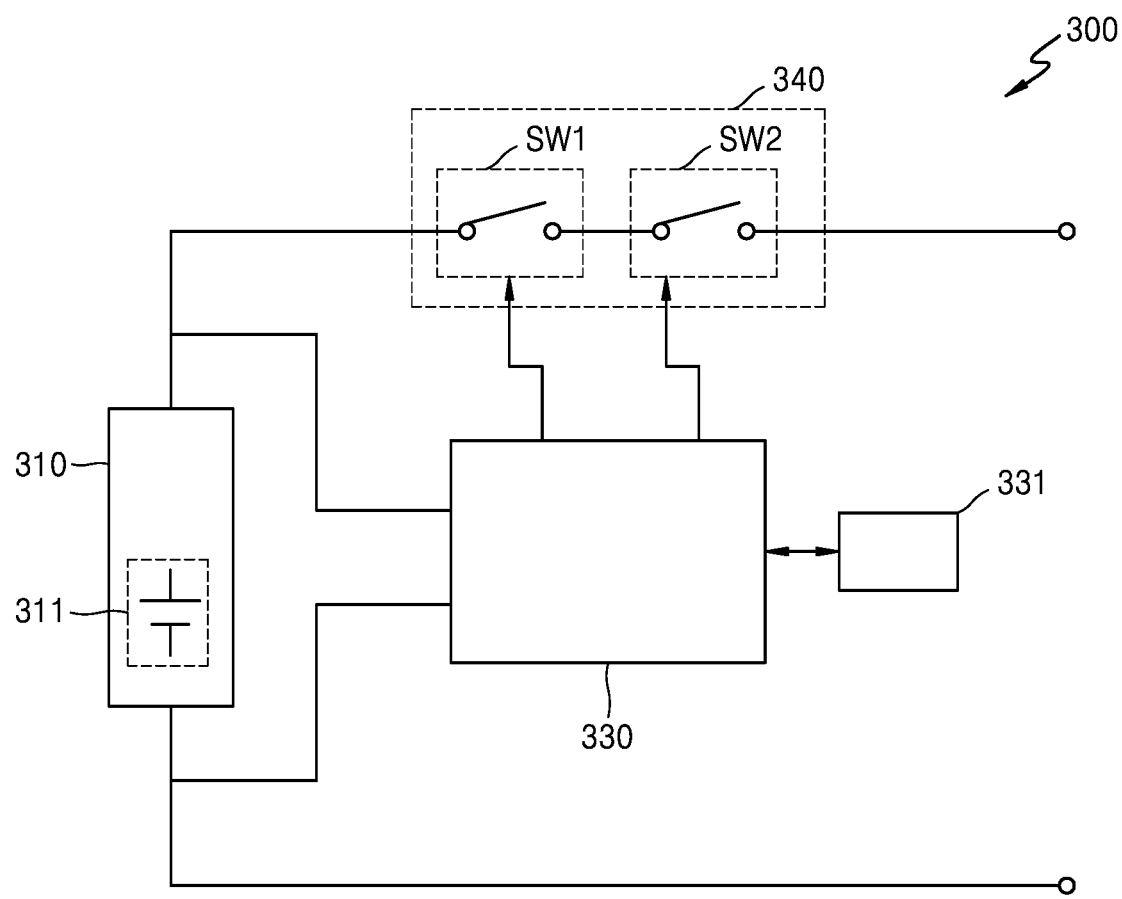
FIG. 4 is a schematic view illustrating the internal structure of a battery pack according to another embodiment.

FIG. 4 is a view schematically illustrating the internal structure of a battery pack according to another embodiment.

Referring to 4, the battery pack 300 includes a battery 310, a battery management system 330, a switch unit 340, and a discharge cut-off voltage offering unit 331. Since the battery 310 and the switch unit 340 are substantially the same as the battery 310 and the switch unit 340 described with reference to FIG. 2, descriptions thereof will not be repeated here.

The discharge cut-off voltage offering unit 331 may provide information about discharge cut-off voltages in preset current periods in response to a request from the battery management system 330. Preset discharge cut-off voltage values are stored in the discharge cut-off voltage offering unit 331 by considering cell voltage imbalance according to current values of the battery 310. The discharge cut-off voltage offering unit 331 may store discharge cut-off voltage values for the battery cells 311 or the battery 310.

In the case in which discharge cut-off voltage values Vc of the battery cells 311 are stored in the discharge cut-off voltage offering unit 331, the battery management system 330 acquires a discharge cut-off voltage value Vc of the battery cells 311 which corresponds to a monitored current value of the battery 310. The battery management system 330 may acquire the discharge cut-off voltage of the battery 310 by multiplying the acquired discharge cut-off voltage of the battery cells 311 by the number of the battery cells 311.

According to an embodiment, the battery management system 330 may adjust the discharge cut-off voltage of the battery 310 to a discharge cut-off voltage value acquired from the discharge cut-off voltage offering unit 331. The battery management system 330 monitors the discharge current of the battery 310 and acquires a discharge cut-off voltage value of the battery 310 corresponding to the monitored discharge current of the battery from the discharge cut-off voltage offering unit 331. If the discharge cut-off voltage offering unit 331 provides a discharge cut-off voltage value for the battery cells 311, the battery management system 330 may determine the discharge cut-off voltage of the battery 310 by multiplying the discharge cut-off voltage value provided by the discharge cut-off voltage offering unit 331 by the number of the battery cells 311. The battery management system 330 may detect the voltage of the battery 310. When the voltage of the battery 310 reaches the discharge cut-off voltage of the battery 310, the battery management system 330 may stop discharging of the battery 310 by turning off a discharge switch SW2.

In addition, current periods preset in the discharge cut-off voltage offering unit 331 may have different lengths by considering the degree of cell voltage imbalance between the battery cells 311. For example, current periods in which the discharge cut-off voltage Vc of the battery cells 311 has constant intervals may be set to the preset current periods. The discharge cut-off voltage Vc of the battery cells 311 may be 2.8 V in a period in which the discharge current of the battery 310 ranges from 0 A to 0.3 A; 2.9 V in a period in which the discharge current of the battery 310 ranges from 0.3 A to 0.5 A; and 3.0 V in a period in which the discharge current of the battery 310 ranges from 0.5 A to 1 A. In this case, the present current periods may be set to be a period ranging from 0 A to 0.3 A, a period ranging from 0.3 A to 0.5 A, and a period ranging from 0.5 A to 1 A. In this case, the discharge cut-off voltage Vc of the battery cells 311 has regular intervals even though the preset current periods have different lengths.

Alternatively, the battery management system 330 may calculate the average of current values of the battery 310 monitored for a preset period of time and may acquire a discharge cut-off voltage value of the battery 310 corresponding to the average from the discharge cut-off voltage offering unit 331. The battery management system 330 may adjust the discharge cut-off voltage of the battery 310 to be the acquired discharge cut-off voltage value.

Alternatively, when the voltage of the battery 310 falls below a preset reference voltage, the battery management system 330 may monitor the discharge current of the battery 310 and may acquire a discharge cut-off voltage value of the battery 310 corresponding to the monitored discharge current of the battery 310 from the discharge cut-off voltage offering unit 331.

Although the discharge cut-off voltage offering unit 331 is shown as a separate unit in the drawing, the discharge cut-off voltage offering unit 331 may be provided as part of the battery management system 330. However, this is a non-limiting example.

Figure 5:
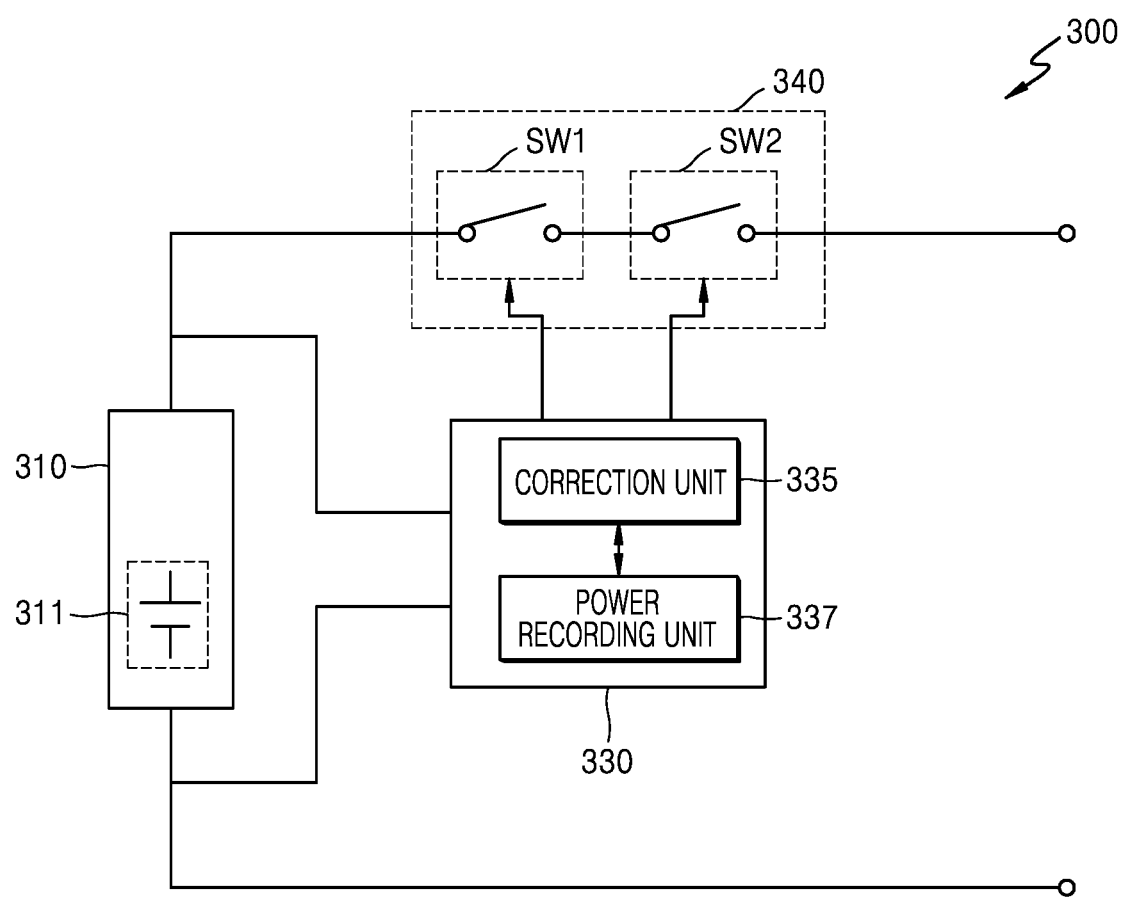
FIG. 5 is a schematic view illustrating the internal structure of a battery pack according to another embodiment.

FIG. 5 is a view schematically illustrating the internal structure of a battery pack according to another embodiment.

Referring to FIG. 5, the battery pack includes a battery management system, a battery, and a switch unit. The battery management system 330 includes a correction unit 335 and a power recording unit 337.

The correction unit 335 may adjust the discharge cut-off voltage of the battery 310 to a proper value on the basis of amounts of discharge stored in the power recording unit 337.

The power recording unit 337 stores the amount of discharge of the battery 310 measured in each preset period set by the battery management system 330. The preset periods may be set by dividing 24 hours of a day into n periods. The battery management system 330 may acquire the amount of power corresponding to the current time period from the power recording unit 337.

According to an embodiment, the battery management system 330 may measure the amount of discharge of the battery 310. The battery management system 330 may measure the amount of discharge of the battery 310 in the preset time periods and may store measured values in the power recording unit 337. In addition, the battery management system 330 may measure the amounts of discharge of the battery 310 in the preset time periods every day, every month, or every year, and may correct amounts of discharge of the battery 310 stored in the power recording unit 337.

The correction unit 335 acquires the amount of discharge of the battery 310 in a time period corresponding to the current time from the power recording unit 337. The correction unit 335 may predict the discharge current of the battery 310 in the time period corresponding to the current time on the basis of the amount of discharge of the battery 310 acquired from the power recording unit 337. For example, when the acquired amount of discharge of the battery 310 is 1000 Wh and the voltage of the battery 310 is 100 V, the correction unit 335 may predict the discharge current of the battery 310 in the time period corresponding to the current time to be about 10 A.

The correction unit 335 may adjust the discharge cut-off voltage of the battery 310 according to the predicted discharge current. If the predicted discharge current is greater than a previously predicted discharge current, the correction unit 335 increases the discharge cut-off voltage of the battery 310 in proportion to the difference. Similarly, if the predicted discharge current is less than the previously predicted discharge current, the correction unit 335 may decrease the discharge cut-off voltage of the battery 310 in proportion to the difference. As described with reference to FIG. 3, the battery 310 includes a plurality of battery cells 311 connected in series, and the voltage difference between the battery cells 311 increases as the discharge current of the battery 310 increases. The discharge cut-off voltage Vc of the battery 310 is set by considering the voltage difference between the battery cells 311 at a given current value. Therefore, the discharge cut-off voltage of the battery 310 is adjusted to a higher value if the predicted discharge current is greater than the previously predicted discharge current and to a lower value in the opposite case.

For example, the pattern in which a load connected to the battery pack 300 consumes power in the preset time periods may be constant every day. The power recording unit 337 may previously store the power consumption pattern of a load connected to the battery pack 300, and it may be predicted, based on the stored power consumption pattern, whether the battery 310 is required to have high output power or low output power. When the load connected to the battery pack 300 is predicted to require high output power, the correction unit 335 may previously adjust the discharge cut-off voltage of the battery 310 to a higher value, and when the load connected to the battery pack 300 is predicted to require low output power, the correction unit 335 may previously adjust the discharge cut-off voltage of the battery 310 to a lower value, thereby making it possible to efficiently use energy stored in the battery 310.

According to an embodiment, when the amount of power corresponding to the current time period is a first amount of power, discharging of the battery 310 is stopped at a third discharge cut-off voltage, and if the amount of power corresponding to the current time period is a second amount of power, discharging of the battery 310 is stopped at a fourth discharge cut-off voltage. The third discharge cut-off voltage corresponds to the first amount of power, and the fourth discharge cut-off voltage corresponds to the second amount of power. In this case, the amount of power at the current time may be predicted from the amounts of power in past time periods so as to predict the discharge current of the battery 310 in each time period. In addition, when the battery management system 330 controls charge and discharge operations of the battery 310, the battery management system 330 may estimate the discharge current of the battery 310 in advance using an amount of power acquired from the power recording unit 337 and may previously set the discharge cut-off voltage of the battery 310 to a proper value in the current time period.

Figure 6:
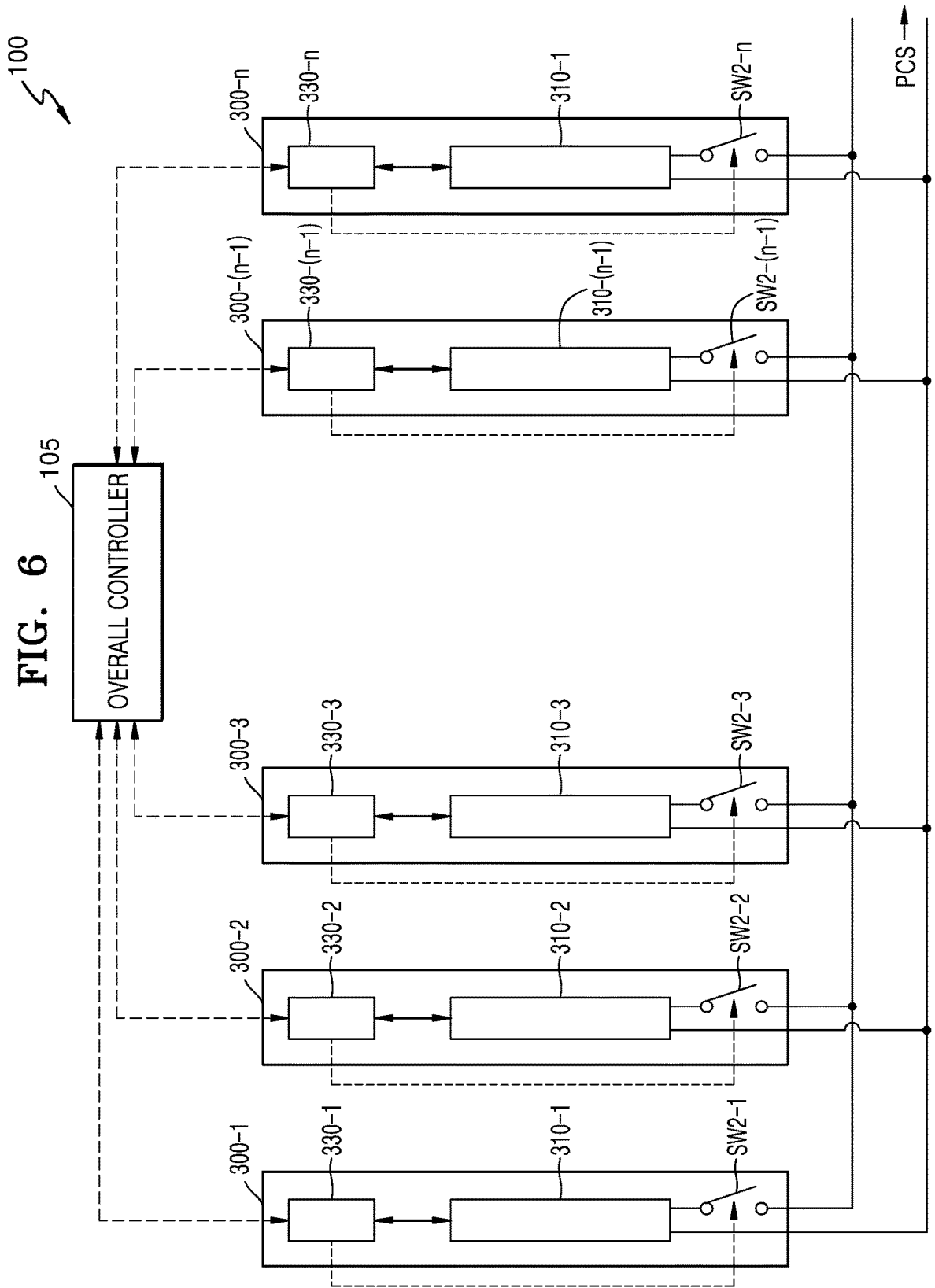
FIG. 6 is a schematic view illustrating an energy storage system according to an embodiment.

FIG. 6 schematically illustrates an energy storage system according to an embodiment.

Referring to FIG. 6, the energy storage system includes a plurality of battery packs 300-1 to 300-$n$ connected in parallel and an overall controller 105. The battery packs 300-1 to 300-$n$ include a battery 310-$m$ and a battery management system 330-$m$ (m is an integer equal to or smaller than n).

The battery management system 330-$m$ monitors the voltage and current of the corresponding battery 310-$m$. The battery management system 330-$m$ may transmit information on the monitored voltage or current to the overall controller 105.

The overall controller 105 may monitors the current and the voltage of each of the battery packs 300-1 to 300-$n$, and may adjust the discharge cut-off voltage of the battery packs 300-1 to 300-$n$ according to monitored results.

According to an embodiment, the battery packs 300-1 to 300-$n$ may be discharged at a first discharge current or a second discharge current. When the battery packs (or each of the battery packs) are discharged at the first discharge current, and at least one of the battery packs reaches a first discharge cut-off voltage, the overall controller 105 stops discharging of the battery packs. When the battery packs (or each of the battery packs) are discharged at the second discharge current, and at least one of the battery packs reaches a second discharge cut-off voltage, the overall controller 105 stops discharging of the battery packs. The first discharge current and the second discharge current are arbitrary discharge current values at which the battery packs may be discharged, and the first discharge current is less than the second discharge current. The first discharge cut-off voltage corresponds to the first discharge current, and the second discharge cut-off voltage corresponds to the second discharge current. The first discharge cut-off voltage is less than the second discharge cut-off voltage.

According to an embodiment, the overall controller 105 may adjust the discharge cut-off voltage of the battery packs 300-1 to 300-$n$ according to the current values of the battery packs 300-1 to 300-$n$. The overall controller 105 may increase the discharge cut-off voltage of the battery packs 300-1 to 300-*n* when the discharge current of the battery packs 300-1 to 300-*n* increases, and may decrease the discharge cut-off voltage of the battery packs 300-1 to 300-*n* when the discharge current of the battery packs 300-1 to 300-*n* decreases. When the voltage of at least one of the battery packs 300-1 to 300-*n* reaches the discharge cut-off voltage of the battery packs 300-1 to 300-*n*, the overall controller 105 may stop discharging of the battery packs 300-1 to 300-*n*. In addition, the overall controller 105 may apply a control signal to the battery management systems 330-1 to 330-*n* such that the battery management systems 330-1 to 330-*n* may stop discharging of corresponding battery packs.

In addition, when the voltage of at least one of the battery packs 300-1 to 300-*n* becomes less than a reference voltage, the overall controller 105 may adjust the discharge cut-off voltage of the battery packs 300-1 to 300-*n*. As described with reference to FIG. 2, when the battery packs 300-1 to 300-*n* approach a discharge cut-off voltage, it may be needed to adjust the discharge cut-off voltage of the battery packs 300-1 to 300-*n*. The overall controller 105 may continuously discharge the battery pack 300-1 through 300-*n* without stop when the voltage of at least one of the battery packs 300-1 through 300-*n* is greater than the reference voltage. When the voltage of at least one of the battery packs 300-1 to 300-*n* reaches the reference voltage, the overall controller 105 may adjust the discharge cut-off voltage of the battery packs 300-1 to 300-*n* to a value corresponding to the discharge current of the battery packs 300-1 to 300-*n*.

According to another embodiment, the overall controller 105 monitors the current of each of the battery packs 300-1 to 300-*n* to detect the maximum current value. The overall controller 105 may adjust the discharge cut-off voltage of the battery packs 300-1 to 300-*n* according to measured current values. For example, the current of the battery pack 300-*m* may vary depending on factors such as the degree of deterioration or internal resistance of the battery packs 300-1 to 300-*n*. Among the battery packs 300-1 to 300-*n*, the battery pack 300-*m* having the maximum current value may have the worst cell voltage imbalance between a plurality of battery cells 311 of the battery pack 300-*m*. If the overall controller 105 sets the discharge cut-off voltage of the battery system 200 on the basis of the sum of current values of the battery packs 300-1 to 300-*n*, among the battery cells of the battery 310 of the battery pack 300-*m* having the maximum current value, there may be a battery cell 311 discharged to a voltage lower than the discharge cut-off voltage of the battery cells 311. In this case, the lifespan of the battery pack 300-*m* having the maximum current value may be negatively affected. Accordingly, the overall controller 105 may detect the largest discharge current among the discharge currents of the battery packs 300-1 to 300-*n*, and may adjust the discharge cut-off voltage of battery packs 300-1 to 300-*n* according to the detected largest discharge current.

Figure 7:
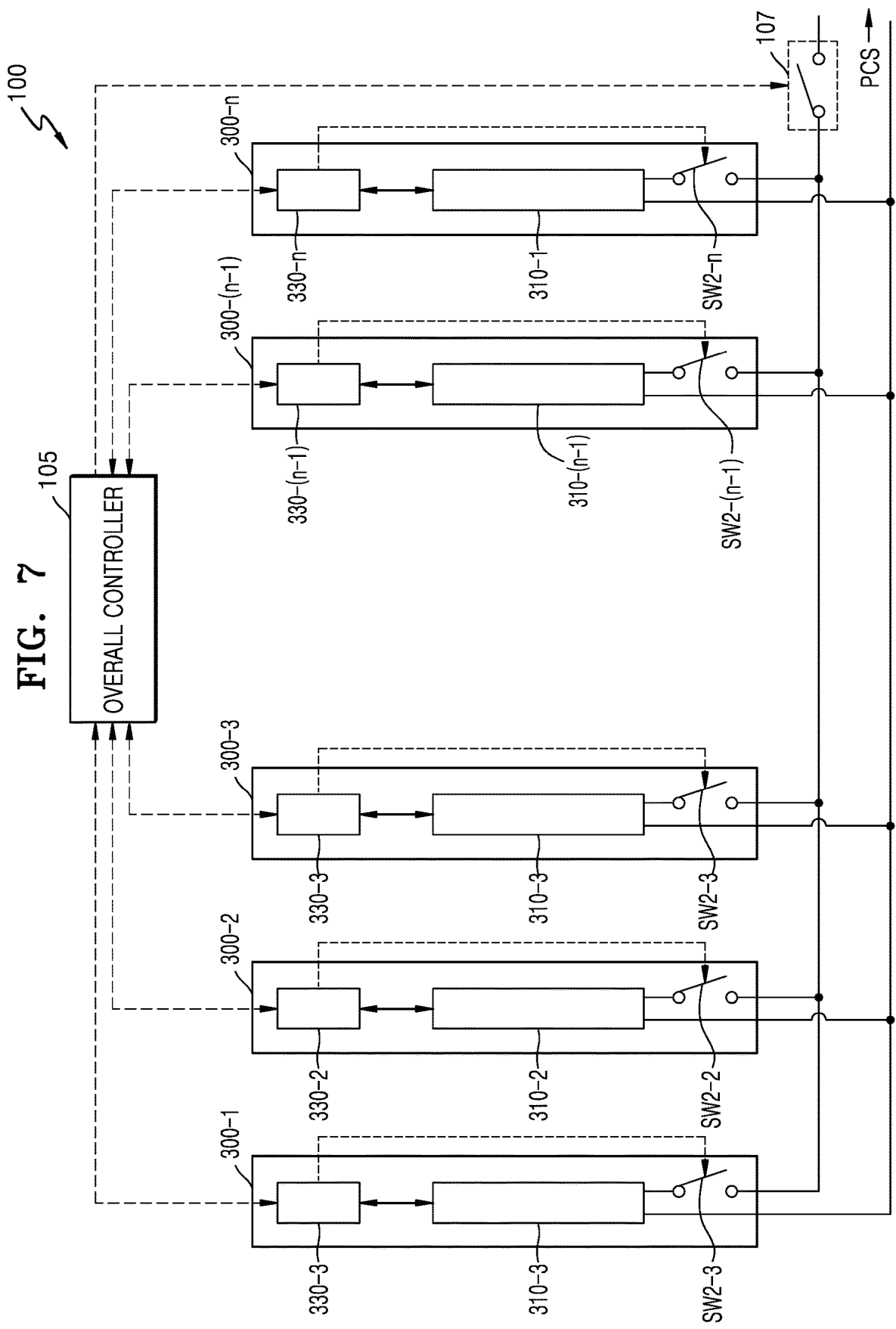
FIG. 7 is a schematic view illustrating an energy storage system according to another embodiment.

FIG. 7 schematically illustrates an energy storage system according to another embodiment.

Referring to FIG. 7, the energy storage system 100 includes a plurality of battery packs 300-1 to 300-*n* connected in parallel, a cut-off switch 111, and an overall controller 105. The battery packs 300-1 to 300-*n* include a battery 310-*m* and a rack BMS 330-*m* (m is an integer equal to or less than n).

Hereinafter, for ease of description, the battery packs 300-1 to 300-*n* will be described as a battery system 200.

The cut-off switch 111 is controlled by the overall controller 105. The cut-off switch 111 is connected between the battery system 200 and a power conversion unit. When the cut-off switch 111 is turned off, discharging of the battery system 200 is stopped.

According to an embodiment, when the voltage of the battery system 200 reaches the discharge cut-off voltage of the battery system 200, the overall controller 105 turns off the cut-off switch 111 to stop discharging of the battery system 200. The overall controller 105 adjusts the discharge cut-off voltage of the battery system 200 according to the discharge current of the battery system 200. The overall controller 105 adjusts the discharge cut-off voltage of the battery system 200 to a higher value as the discharge current of the battery system 200 increases. The overall controller 105 adjusts the discharge cut-off voltage of the battery system 200 to a lower value as the discharge current of the battery system 200 decreases. The overall controller 105 may determine whether the discharge current of the battery system 200 increases or decreases on the basis of a current value corresponding to a previous discharge cut-off voltage. The overall controller 105 turns off the cut-off switch 111 to stop discharging of the battery system 200 when the voltage of the battery system 200 reaches the adjusted discharge cut-off voltage.

According to another embodiment, the overall controller 105 may previously set the discharge cut-off voltage of the battery system 200 according to the discharge current of the battery system 200 by considering the voltage difference between battery cells 311 of batteries 310 of the battery packs 300-1 to 300-*n*. The discharge cut-off voltage of the battery system 200 may be a value obtained by multiplying the number of battery cells 311-*m* included in a battery 310-*m* of the battery pack 300-*m* by the discharge cut-off voltage Vc of the battery cells 311-*m*. The discharge current of the battery system 200 corresponding to the discharge cut-off voltage of the battery system 200 may be a value obtained by multiplying a discharge current value of a battery cell 311-*m* corresponding to the discharge cut-off voltage of the battery cell 311-*m* by the number of the battery packs 300-1 to 300-*n*. In this case, the overall controller 105 may adjust the discharge cut-off voltage of the battery system 200 on the basis of information about discharge cut-off voltage values of the battery system 200 previously stored according to discharge current values of the battery system 200.

According to another embodiment, the overall controller 105 may measure the amount of discharge of the battery system 200 in preset time periods as described with reference to FIG. 2, and may store measured values in the power recording unit 337 (refer to FIG. 5). The overall controller 105 may measure the amount of discharge of the battery system 200 every day, every month, every quarter, or every year to update amounts of discharge stored in the power recording unit 337 (refer to FIG. 5).

The overall controller 105 acquires an amount of discharge of the battery system 200 corresponding to the current time from the power recording unit 337 (refer to FIG. 5). The overall controller 105 may predict the discharge current of the battery system 200 on the basis of an acquired amount of discharge of the battery system 200. The overall controller 105 may determine a discharge cut-off voltage according to the predicted discharge current to adjust the previous discharge cut-off voltage of the battery system 200. The overall controller 105 may use the discharge current of the battery system 200 corresponding to the previous discharge cut-off voltage of the battery system 200 as a reference discharge current to compare the predicted discharge current of the battery system 200 with the reference discharge current and accordingly to adjust the discharge cut-off voltage of the battery system 200 to a higher or lower value. Alternatively, the overall controller 105 may previously store information about the discharge cut-off voltage of the battery system 200 corresponding to the discharge current of the battery system 200, and may obtain a discharge cut-off voltage value corresponding to the predicted discharge current of the battery system 200 from the information.

Preferable embodiments of the present disclosure have been mainly described. However, it will be apparent to those skilled in the art that various changes and modifications may be made without departing from the spirit and scope of the present disclosure. Therefore, the embodiments described herein should be considered in a descriptive sense only and not for purposes of limitation. The scope of the present disclosure is defined not by the above description but by the following claims, and all differences within equivalent ranges of the scope of the present disclosure should be considered as being included in the scope of the present disclosure.

The invention claimed is:

1. A battery pack comprising:
a battery comprising at least one battery cell and configured to be discharged at a first discharge current or a second discharge current;
a switch connected to the battery and placed on a high current path through which a charge current and a discharge current of the battery flow; and
a battery management system configured to predict a discharge current based on an amount of power of the battery in a preset time period, and adjust a discharge cut-off voltage of the battery based on the discharge current;
wherein when the discharge current of the battery is during a first current period corresponding to the first discharge current, discharging of the battery is stopped as a voltage of the battery reaches a first discharge cut-off voltage, and when the discharge current of the battery is during a second current period corresponding to the second discharge current, discharging of the battery is stopped as the voltage of the battery reaches a second discharge cut-off voltage,
wherein the first discharge current is greater than the second discharge current, and the first discharge cut-off voltage is greater than the second discharge cut-off voltage.

2. The battery pack of claim 1, wherein the battery management system adjusts the discharge cut-off voltage of the battery to the first discharge cut-off voltage or the second discharge cut-off voltage when the voltage of the battery reaches a first voltage.

3. The battery pack of claim 1, wherein when the discharge current is during the first current period, the battery management system adjusts the discharge cut-off voltage of the battery to the first discharge cut-off voltage, and
when the discharge current is during the second current period, the battery management system adjusts the discharge cut-off voltage of the battery to the second discharge cut-off voltage.

4. The battery pack of claim 1, wherein when an average of the discharge current of the battery for the preset time period is during the first current period, the battery management system adjusts the discharge cut-off voltage of the battery to the first discharge cut-off voltage, and when the average of the discharge current of the battery for the preset time period is the second discharge current, the battery management system adjusts the discharge cut-off voltage of the battery to the second discharge cut-off voltage.

5. The battery pack of claim 1, wherein the battery management system acquires the amount of power corresponding to the preset time period from a power recording unit,
when the amount of power corresponds to a first amount of power, the battery management system adjusts the discharge cut-off voltage of the battery to a third discharge cut-off voltage and discharging of the battery is stopped as the voltage of the battery reaches the third discharge cut-off voltage, and
when the amount of power corresponds to a second amount of power, the battery management system adjusts the discharge cut-off voltage of the battery to a fourth discharge cut-off voltage and discharging of the battery is stopped as the voltage of the battery reaches the fourth discharge cut-off voltage.

6. The battery pack of claim 5, wherein the second amount of power is greater than the first amount of power, and the fourth discharge cut-off voltage is greater than that the third discharge cut-off voltage.

7. An energy storage system comprising:
a plurality of battery packs each comprising a battery and a battery management system configured to control charging and discharging of the battery, the battery comprising at least one battery cell; and
an overall controller configured to predict a discharge current based on an amount of power of the battery in a preset time period, adjust a discharge cut-off voltage of the battery based on the discharge current, and to control charging and discharging of the plurality of battery packs,
wherein when the discharge current of the plurality of battery packs is during a first current period corresponding to a first discharge current, and a voltage of at least one of the plurality of battery packs reaches a first discharge cut-off voltage, the overall controller stops discharging, and
when the discharge current of the plurality of battery packs is during a second current period corresponding to a second discharge current, and the voltage of at least one of the plurality of battery packs reaches a second discharge cut-off voltage, the overall controller stops discharging.

8. The energy storage system of claim 7, wherein the second discharge current is greater than the first discharge current, and the second discharge cut-off voltage is greater than the first discharge cut-off voltage.

9. The energy storage system of claim 7, wherein the battery management system monitors a voltage and a discharge current of a corresponding battery pack and transmits information about the monitored voltage and discharge current to the overall controller.

10. The energy storage system of claim 9, wherein the overall controller determines the first discharge cut-off voltage and the second discharge cut-off voltage on a basis of a number of battery cells included in each of the plurality of battery packs and a number of the plurality of battery packs.

11. The energy storage system of claim 10, wherein the overall controller adjusts a discharge cut-off voltage to the first discharge cut-off voltage or the second discharge cut-off voltage when the voltage of at least one of the battery packs reaches a first voltage.

12. The energy storage system of claim 8, wherein when the discharge current is during the first current period, the overall controller adjusts a discharge cut-off voltage to the first discharge cut-off voltage, and when the discharge current is during the second current period, the overall controller adjusts the discharge cut-off voltage to the second discharge cut-off voltage.

13. The energy storage system of claim 8, wherein when an average of the discharge current of the plurality of battery packs for the preset time period is the first discharge current, the overall controller adjusts a discharge cut-off voltage to the first discharge cut-off voltage, and when the average of the discharge current of the plurality of battery packs for the preset time period is the second discharge current, the overall controller adjusts the discharge cut-off voltage to the second discharge cut-off voltage.

14. The energy storage system of claim 7, wherein the overall controller acquires the amount of power corresponding to a preset time period from a power recording unit, when the amount of power corresponds to a first amount of power, the overall controller adjusts a discharge cut-off voltage to a third discharge cut-off voltage, and discharging of the battery is stopped as the voltage of at least one of the plurality of battery packs reaches the third discharge cut-off voltage, and when the amount of power corresponds to a second amount of power, the overall controller adjusts the discharge cut-off voltage to a fourth discharge cut-off voltage and discharging of the battery is stopped as the voltage of at least one of the plurality of battery packs reaches the fourth discharge cut-off voltage.

15. The energy storage system of claim 14, wherein the second amount of power is greater than the first amount of power, and the fourth discharge cut-off voltage is greater than that the third discharge cut-off voltage.

* * * * *